United States Patent [19]

Iwai

[11] 4,399,797
[45] Aug. 23, 1983

[54] INTAKE HEATING SYSTEM FOR OUTBOARD ENGINE

[75] Inventor: Tomio Iwai, Hamamatsu, Japan

[73] Assignees: Yamaha Hatsudoki Kabushiki Kaisha; Shanshin Kogyo Kabushiki Kaisha, both of Iwata, Japan

[21] Appl. No.: 266,994

[22] Filed: May 26, 1981

[30] Foreign Application Priority Data

May 30, 1980 [JP] Japan ................. 55-72958

[51] Int. Cl.³ ............................. F02M 31/00
[52] U.S. Cl. ................... 123/552; 123/545; 123/41.31; 261/144
[58] Field of Search ............ 123/557, 552, 142.5 R, 123/545, 547, 41.31; 261/144, 145

[56] References Cited

U.S. PATENT DOCUMENTS 1,300,600 4/1919 Giesler .................... 123/552
2,807,245 9/1957 Unger ..................... 123/41.31
4,302,407 11/1981 Hartel .................... 123/545

FOREIGN PATENT DOCUMENTS 788155 2/1963 Canada ................... 123/545
1174587 3/1959 France .................... 123/545

Primary Examiner—Ronald H. Lazarus
Attorney, Agent, or Firm—Harness, Dickey & Pierce

[57] ABSTRACT

A combined cooling and heating system for an internal combustion engine. The system includes a cooling jacket that cools the cylinder block and which discharges through a thermostatically controlled valve into a coolant sump having upper and lower outlets. The lower outlet discharges into a heating jacket for the induction system so as to provide induction system heating that is relatively independent of the engine speed. The upper sump outlet discharges into the cylinder head cooling jacket.

15 Claims, 2 Drawing Figures

INTAKE HEATING SYSTEM FOR OUTBOARD ENGINE

BACKGROUND OF THE INVENTION

This invention relates to an intake heating system for an outboard engine and more particularly to a cooling system designed to provide the desired degree of cooling and heating for various components of the engine in adequate quantities regardless of engine speed.

In various types of internal combustion engines and particularly outboard motors of the water-cooled type, it is the practice to heat at least a portion of the induction system. Heating of the induction system with the engine coolant improves fuel vaporization and reduces variation in mixture strength, particularly upon acceleration or deceleration. With prior art type of systems, it has been the practice to circulate the cooling liquid flowing past the thermostat through the intake system for heating the intake system. However, when the engine is running at low loads or at low speeds, as during trolling, insufficient heat is generated to heat the induction system sufficiently.

It is, therefore, a principal object of this invention to provide an improved cooling system for an internal combustion engine.

It is a further object of this invention to provide an engine cooling system wherein the desired temperature may be maintained for a number of components of the engine.

It is a yet further object of this invention to provide an improved heating system for the induction system of an internal combustion engine that provides adequate degrees of heating even at low engine speeds.

SUMMARY OF THE INVENTION

A first feature of this invention is adapted to be embodied in a heating system for the induction system of an internal combustion engine that includes an induction system heating jacket in heat exchanging relationship to a portion of the induction system. A coolant pump is driven by the engine for circulating coolant. The engine is also provided with a coolant jacket which is in heat exchanging relationship with a portion of the engine. Conduit means deliver coolant pumped by the coolant pump to the cooling jacket. In accordance with this feature of the invention, means deliver heated coolant from the cooling jacket to the heating jacket of the induction system at a rate that is independent of the rate of coolant flow through the cooling jacket.

Another feature of this invention is adapted to be embodied in a liquid cooling system for an internal combustion engine that includes a first cooling jacket portion in heat exchanging relationship with a first portion of the engine and a second cooling jacket portion in heat exchanging relationship to a second portion of the engine. Each of the cooling jacket portions have respective inlets and outlets. The cooling system also includes a sump and a thermostatically controlled conduit interconnecting the first coolant jacket outlet with the sump for delivering heated coolant to the sump from the first coolant jacket portion. Upper and lower coolant outlets are positioned in the sump, one above the other. In accordance with this feature of the invention, coolant means connect the sump lower coolant outlet with the second coolant jacket inlet for delivering coolant from the sump to the second coolant jacket portion.

DETAILED DESCRIPTION OF THE PREFERRED EMBODIMENT

Figure 1:
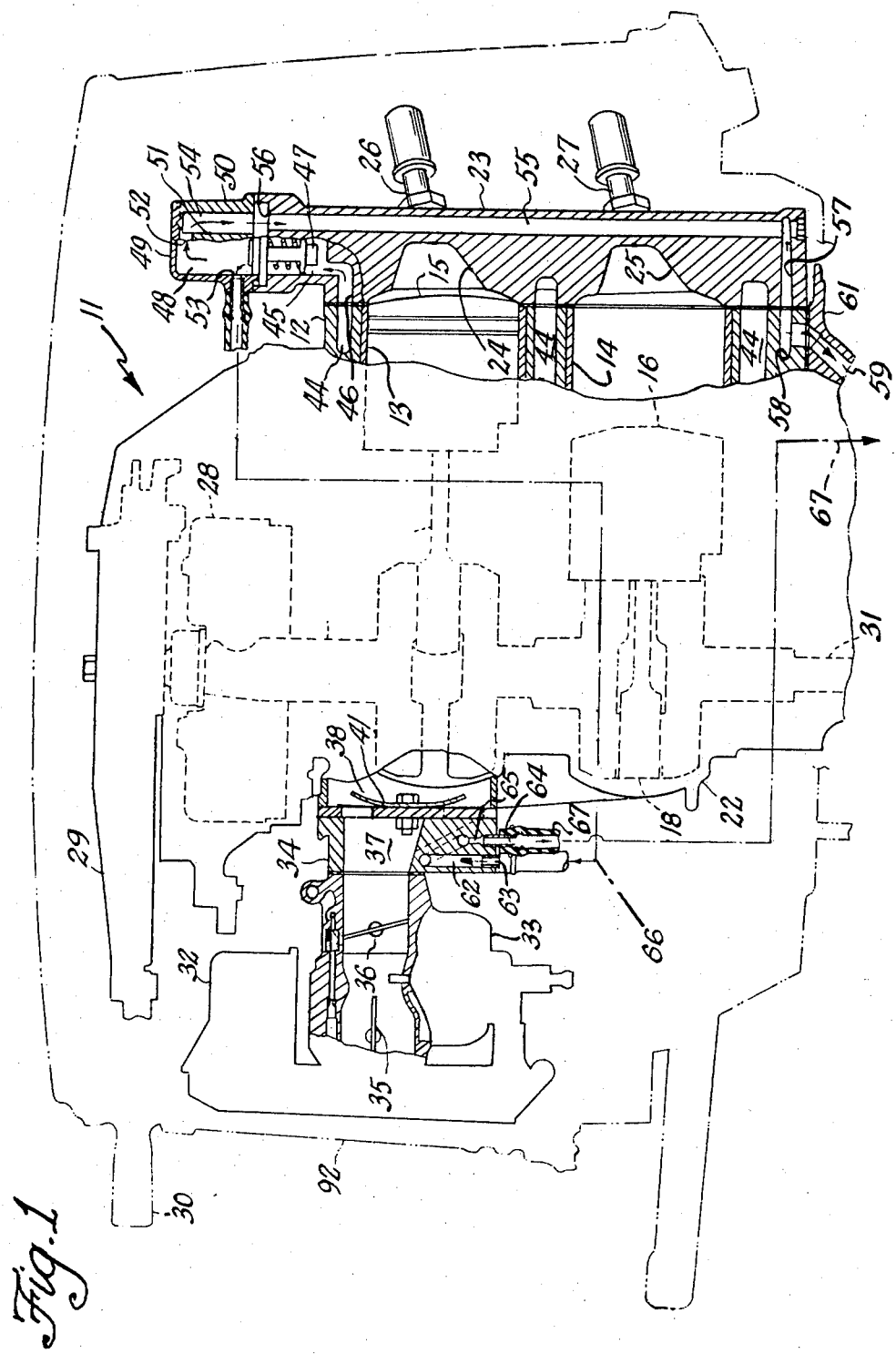
FIG. 1 is a side elevational view, with portions broken away, of an outboard motor constructed in accordance with this invention.
Figure 2:
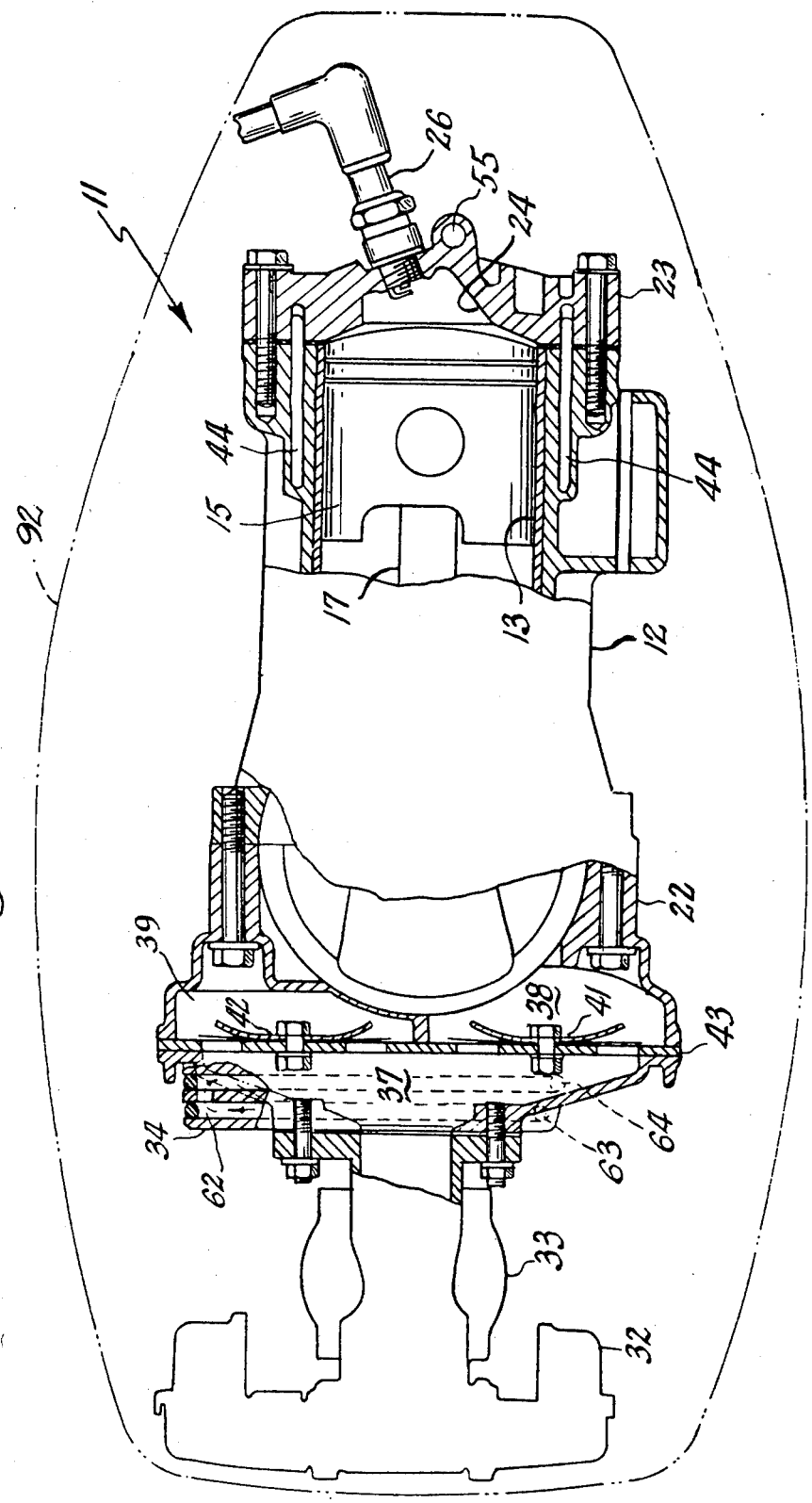
FIG. 2 is a top plan view of the engine, with further portions broken away.

In the drawings an outboard motor having a cooling system constructed in accordance with this invention is identified generally by the reference numeral 11. The motor 11 is of the two-cycle, two-cylinder type. It is to be understood, however, that the invention is susceptible of use in conjunction with other types of engines such as four-cycle and also engines having different numbers of cylinders and different cylinder configurations.

The engine 11 includes a cylinder block 12 having a pair of cylinder bores 13 and 14, one positioned above the other. Pistons 15 and 16 are slideably supported in the cylinder bores 13 and 14, respectively, and are connected by means of respective connecting rods 17 and 18 to a vertically extending crankshaft 20. The crankshaft 20 is supported for rotation in any known manner in a crankcase 22. A cylinder head 23 is affixed in any known manner to the cylinder block 12. The cylinder head 23 has a pair of cavities 24 and 25 which cooperate with the pistons 15 and 16 and cylinder bores 13 and 14 to provide the respective combustion chambers of the engine. Sparkplugs 26 and 27 are positioned in the cylinder chambers 24 and 25, respectively, for firing the charge therein.

A flywheel 28 is affixed to the upper end of the crankshaft 20 and is juxtaposed to a recoil starter mechanism, indicated generally by the reference numeral 29. A handle, shown in phantom and indicated by the reference numeral 30, is connected by means of a starting rope (not shown) to the starter mechanism 29 for permitting pull starting of the engine 11 in a known manner.

The lower end of the crankshaft 20 is connected to a driveshaft 31 which extends through the driveshaft housing of the engine and terminates at the lower drive unit (not shown).

The engine 11 is also provided with an induction system that consists of silencer 32, curburetor 33, and intake manifold 34. The carburetor 33 has a choke valve 35 and throttle valve 36 and is otherwise conventional. For that reason, the details of its construction and operation will not be given.

The carburetor 33 has its discharge end in communication with an intake passage 37 of the intake manifold 34. The intake passage 37 discharges into crankcase chambers 38 and 39 via respective reed valves 41 and 42. The valves 41 and 42 are carried by a valve plate 43 that is interposed between the intake manifold 34 and the mating flange of the crankcase 22. The crankcase chambers 38 and 39 serve the respective combustion chambers 24 and 25 through transfer ports (not shown). The construction of the engine as thus far described is conventional and, for that reason, further details of its construction have not been given.

The engine 11 is provided with a water-cooling system that embodies this invention and which will now be described. This water-cooling system includes a water pump (not shown) which is driven by an intermediate portion of the driveshaft 31 in a known manner and which draws cooling water from the water surrounding the engine 11 and in which its lower drive unit is immersed. The water pump preferably is provided with an impeller having rubber blades so that the volume of water it pumps will be dependent upon the speed at which the engine 11 is operating. The cooling water delivered by the water pump is first delivered to a cylinder block cooling jacket 44 and more specifically to an inlet of the cooling jacket 44. As is well known, the jacket 44 surrounds the cylinder bores 13 and 14 to provide cooling therefor.

The flow of water through the cylinder block cooling jacket 44 is in a vertically upward direction so that the coolant first passes around a cylinder bore 14 and then around the cylinder bore 13. The coolant is discharged from the cylinder block cooling jacket 44 via an outlet port 45 which is formed at the upper end of the cylinder head 23 and which is in communication with the cylinder block cooling jacket 44 by means of a passage 46. A thermostatic valve 47 controls the discharge of water from the discharge passage 45 into a sump, indicated generally by the reference numeral 48. The sump 48 is provided at the upper end of the cylinder head 23 with the thermostat 47 being placed at its lower end.

The sump 48 is defined by a cover member 49 and coverplate 50 which are affixed to each other and to the cylinder head 23. The coverplate 50 defines a vertically extending wall 51 that lies on one side of the sump 48 and is formed with an outlet passage 52 contiguous to its uppermost end. A lower outlet passage 53 is formed in the cover 49 closely adjacent the lower edge of the sump cavity 48. The upper outlet passage 52 communicates with a vertically extending passageway 54 formed in the coverplate 50 which, in turn, communicates with a cylinder head cooling jacket 55 at its inlet end 56.

The lower end of the cylinder head cooling jacket 55 is formed with an outlet port 57 which communicates with a water return 58 of the cylinder block 12. The cylinder block water return 58 discharges into a water discharge passage 59 formed in the driveshaft housing 61. Water is returned to the body in which the motor 11 is operating from the return passage 59.

The intake manifold 34 is formed with a heating jacket 62 in the form of a passage that extends in a zig-zag pattern along the lower end of the induction passage 37. The manifold heating jacket 62 is formed with an inlet fitting 63 and an outlet fitting 64 at its opposite ends. An orifice 65 of calibrated size is positioned immediately adjacent the outlet fitting 64 so as to control the rate of flow of coolant through the manifold heating jacket 62.

Coolant is provided to the manifold heating jacket inlet 63 via a flexible conduit, shown in part schematically at 66. The conduit 66 is provided with coolant from the lower sump outlet port 53. Coolant from the manifold heating jacket 62 is returned to the body of water in which the motor 11 is operating via a return conduit 67.

In operation when the engine 11 is first started, the coolant pump will circulate coolant only through the cylinder block cooling jacket 44 through a relatively small bypass passage (not shown). This is because the thermostat 47 will be closed and no coolant will be discharged into the sump cavity 48. Because of the relatively restricted flow of coolant, the engine 11 will reach its operating temperature rapidly and the thermostat 47 will begin to open. Coolant will then be immediately delivered to the sump cavity 48 and due to the low position of the outlet 53 in the sump 48, coolant will be delivered via the conduit 66 to the intake manifold heating jacket 62. The flow of coolant through the jacket 62 is controlled by the size of the orifice 65, as aforenoted, and coolant will gradually accumulate in the sump 48, depending upon the speed at which the engine 11 is operating. Gradually the coolant in the sump 48 will rise to the higher outlet 52 at which time it will be delivered through the passage 54 to the cylinder head cooling jacket 55. Thus, when cylinder head cooling is required, it will be provided through the sump outlet passage 52.

During the periods when the engine 11 is operated at idling or extremely low speed, such as when trolling, the thermostat 47 will alternately open and close to maintain the desired temperature for the cylinder block 12. During the open periods, heated coolant will be circulated through the manifold heating jacket 62 and will further be accumulated in the sump cavity 48 due to the action of the orifice 65. During periods when the thermostat 47 is closed, coolant will be delivered from that accumulated in the sump 48 through the lower outlet 53 to the manifold heating jacket 62. Thus, once the engine reaches it operating temperature, there will be a continuous flow of heated coolant through the intake manifold heating jacket 62 regardless of the speed at which the engine is operated. Thus, a uniform degree of heating will be provided for the intake charge and variations in mixture strength will be avoided.

During prolonged high speed running the thermostat 47 will be maintained in a fully opened position and the coolant in the sump 48 will rapidly accumulate to the level at which it reaches the upper outlet passage 52 for delivery to the cylinder head cooling jacket 55. Thus, the likelihood of overheating is avoided. Heating of the intake charge will nevertheless be maintained, although at the pre-established rate determined by the size of the orifice 65. Thus, there will not be any loss in maximum power output due to excessive heating of the intake charge.

As has been previously noted, the water pump embodies a rubber impeller having flexible blades. Thus, when the thermostat 47 is closed, excessive pressure will not be built up in the cooling jacket 44. Alternatively, when the thermostat 47 is opened, the blades are free to assume a more straightened position and increase the capacity of water circulated.

It should be readily apparent that by properly sizing the orifice 65 the desired degree of heating of the intake charge can be provided. Also, the amount of coolant circulated through the manifold heating jacket 62 will be relatively independent of engine speed due to the use of the sump 48 and coolant will even be circulated at such times as the thermostat 47 is closed once the engine has reached its operating temperature. Also, excess heating of the intake charge at high outputs is avoided.

Although the invention has been described in conjunction with a two-cylinder, two-cycle engine, it should be readily apparent that it can be used in conjunction with other engine configurations and four-cycle engines. Various other changes and modifications may be made without departing from the spirit and scope of the invention, as defined by the appended claims.

I claim:
1. A heating system for the induction system of an internal combustion engine comprising an induction system heating jacket in heat exchange relationship to a portion of said induction system, a coolant pump driven by said engine for pressurizing and circulating from a coolant source, a coolant jacket in heat exchanging relationship with a portion of the engine, conduit means for delivering the coolant pressurized by said coolant pump to said coolant jacket, a first return for returning coolant from said coolant jacket to the coolant source, said first return being substantially unrestricted under all running conditions, and means including a second return for delivering the heated coolant from said coolant jacket to said heating jacket, said second return including means for restricting the flow through said heating jacket to a rate independent of the pressure exerted on the coolant by said pump.

2. A heating system as set forth in claim 1 further including thermostat means for restricting the flow of coolant through the coolant jacket until the temperature of the coolant therein exceeds a predetermined value.

3. A heating system as set forth in claim 1 wherein the means for delivering heated coolant to the heating jacket includes a sump in fluid communication with the discharge of the coolant jacket.

4. A heating system as set forth in claim 3 further including thermostat means interposed between the coolant jacket and the sump for restricting the delivering of coolant to the sump until the coolant exceeds a predetermined temperature.

5. A heating system as set forth in claim 4 wherein the coolant pump provides a delivery of coolant that is related to the speed of the associated engine.

6. A heating system as set forth in claim 5 wherein the coolant pump has flexible blades.

7. A liquid cooling system for an internal combustion engine comprising a first coolant jacket portion in heat exchanging relation with a first portion of said engine, a second coolant jacket portion in heat exchanging relationship to a second portion of said engine, each of said coolant jacket portions having a respective inlet and outlet, a sump, a thermostatically controlled conduit interconnecting said first coolant jacket portion outlet with said sump for delivering heated coolant to said sump, a lower coolant outlet in said sump, an upper coolant outlet in said sump located at a higher elevation than said lower sump coolant outlet, and conduit means connecting said lower sump coolant outlet with said second coolant jacket portion inlet for delivering coolant from said sump to said second coolant jacket portion.

8. A liquid cooling system as set forth in claim 7 wherein the first coolant jacket portion is in heat exchanging relationship with a portion of the engine which generates heat and the second coolant jacket portion is in heat exchanging relationship with the induction system of the engine for heating the charge delivered to the engine.

9. A liquid cooling system as set forth in claim 7 further including a third coolant jacket portion in heat exchanging relationship with a third portion of the engine, said third coolant jacket portion having an inlet and an outlet, and conduit means interconnecting the upper coolant outlet of the sump with the inlet of the third coolant jacket portion.

10. A liquid cooling system as set forth in claim 9 further including coolant pump for circulating coolant to the first coolant jacket portion inlet, the first coolant jacket portion being in heat exchanging relationship with the cylinder block of the engine, the second coolant jacket portion being in heat exchanging relationship with the induction system for heating the charge delivered to the engine and the third coolant jacket portion being in heat exchanging relationship with the cylinder head.

11. A heating system for the induction system of an internal combustion engine comprising an induction system heating jacket in heat exchange relationship to a portion of said induction system, a coolant pump for circulating coolant, a coolant jacket in heat exchanging relationship with a portion of the engine, conduit means for delivering the coolant by said coolant pump to said coolant jacket, a sump adapted to contain a predetermined amount of coolant, heating conduit means for communicating said sump with said heating jacket for delivering coolant from said sump to said heating jacket means, restriction means providing a constant restriction to the flow of coolant through said heating conduit means, and means for delivering the heated coolant from said coolant jacket to said sump, said restriction means restricting the flow from said sump to said heating jacket to an amount less than that circulated by said coolant pump at low speed of the engine for accumulating heated coolant in said sump at low engine speed.

12. A heating system as set forth in claim 11 further including thermostat means for restricting the flow of coolant through the coolant jacket until the temperature of the coolant therein exceeds a predetermined value.

13. A heating system as set forth in claim 12 further including thermostat means interposed between the coolant jacket and the sump for restricting the delivering of coolant to the sump until the coolant exceeds a predetermined temperature.

14. A heating system as set forth in claim 13 wherein the coolant pump provides a delivery of coolant that is related to the speed of the associated engine.

15. A heating system as set forth in claim 14 wherein the coolant pump has flexible blades.

* * * * *